United States Patent [19]

Nagase et al.

[11] Patent Number: 4,894,202

[45] Date of Patent: Jan. 16, 1990

[54] METHOD OF INHIBITING RADIOACTIVE SUBSTANCES FROM ELUTING INTO COOLING WATER IN A NUCLEAR PLANT AND AN APPARATUS THEREFOR

[75] Inventors: Makoto Nagase, Hitachi; Yamato Asakura, Katsuta; Hidetoshi Karasawa, Katsuta; Masaharu Sakagami, Katsuta; Shunsuke Uchida, Hitachi; Toshio Sawa, Hitachi; Katsumi Ohsumi, Hitachi, all of Japan

[73] Assignee: Hitachi, Ltd., Tokyo, Japan

[21] Appl. No.: 103,705

[22] Filed: Oct. 2, 1987

[30] Foreign Application Priority Data

Oct. 3, 1986 [JP] Japan .................. 61-234641

[51] Int. Cl.$^4$ .................................. G21C 1/01
[52] U.S. Cl. .................................. 376/306
[58] Field of Search ............ 376/306, 900, 414, 416, 376/417

[56] References Cited

U.S. PATENT DOCUMENTS

| | | | |
|---|---|---|---|
| 3,142,625 | 7/1964 | Wellborn | 376/306 |
| 4,476,047 | 10/1984 | Bonnici et al. | 376/306 X |
| 4,526,626 | 7/1985 | Carter | 376/306 X |
| 4,722,823 | 2/1988 | Honda et al. | 376/306 |

FOREIGN PATENT DOCUMENTS 61-079194  4/1986  Japan .

*Primary Examiner*—John S. Maples
*Attorney, Agent, or Firm*—Antonelli, Terry & Wands

[57] ABSTRACT

Disclosed is a method and apparatus for inhibiting radioactive substances eluting into cooling water of a nuclear plant. The method uses an index consisting of an amount of iron adhered onto the fuel cladding surface, that is calculated from the iron concentration of the cooling water and the operation time. A formation of a layer of the iron oxide on the fuel cladding surface is confirmed based upon the covering ratio of 100%. When the covering ratio is smaller than 100%, the iron concentration in the cooling water is controlled to remain constant at a maximum concentration. The Fe/Ni molar concentration ratio in the cooling water is adjusted to be set from about 2 to 10 after the layer of iron oxide reaches a covering ratio of 100%. $^{58}$Co ion and $^{60}$Co ion concentrations in the cooling water can be decreased without greatly increasing the concentration of precipitating radioactive crud, and the surface dosage in the primary system can be decreased at the time of regular checking.

13 Claims, 4 Drawing Sheets

Fe, Ni CONCENTRATION IN FEED WATER

Fe, Ni CONCENTRATION IN FEED WATER

METHOD OF INHIBITING RADIOACTIVE SUBSTANCES FROM ELUTING INTO COOLING WATER IN A NUCLEAR PLANT AND AN APPARATUS THEREFOR

BACKGROUND OF THE INVENTION

1. Field of Invention

The present invention relates to a method of inhibiting radioactive substances from eluting into the cooling water in a nuclear plant, such as a boiling water reactor (BWR) or an advanced converter, and to an apparatus therefor. More particularly, the present invention relates to a method of inhibiting radioactive substances from eluting into the cooling water in a nuclear plant in which the iron concentration in the cooling water is reduced smaller than 1 ppb, wherein the surface dosage in the primary system is reduced, and to an apparatus therefor.

2. Description of the Prior Art

A conventional method of inhibiting radioactive substances from eluting into the cooling water in the boiling water reactor has been disclosed, for example in Japanese Patent Laid-Open No. 79194/1986, according to which, when the boiling water reactor is placed in the business operation, the Fe/Ni molar concentration ratio in the boiling water reactor is controlled at a level of 2 to 8; however, no satisfactory results are produced therein.

The above conventional method is practiced under the observation by model analysis that the minimum surface dosage in the primary system is obtained after about 3000 hours from the start of operation of the boiling reactor. Therefore, the control of the Fe/Ni molar concentration ratio is practiced inevitablely after about 3000 hours from the beginning of the operation of the boiling water reactor.

Besides in another prior art method of inhibiting radioactive substances from eluting into the cooling water in the boiling water reactor, the iron concentration in the cooling water is gradually increased with the radioactive cobalt ($^{58}Co$) ion concentration in the cooling water as an index, nickel ions being brought into the nuclear reactor from the feed water system becoming the radioactive cobalt ($^{58}Co$) ions.

In the above mentioned conventional method, however, no consideration has been given to the iron crud, for example $\alpha$-$Fe_2O_3$, on the fuel cladding surface, and to the covering ratio at which the outer surface of the fuel rod including the fuel pellets therein, or the outer surface of the fuel cladding tube, is covered with the iron crud that affects the reaction of the iron crud with nickel and cobalt. The corrosion substance formed on the cladding tube is iron, cobalt or nickel, the radioactive substances being $^{58}Co$, $^{60}Co$ or $^{54}Mn$.

During the initial stage of the operation cycle in the business operation and in case the nickel ion concentration has dropped greatly, furthermore, the index, i.e., the Fe/Ni molar concentration ratio, becomes no more effective in decreasing the $^{58}Co$ ion and $^{60}Co$ ion concentrations in the cooling water. Further, when it is attempted to increase the Fe/Ni molar concentration ratio, the iron crud may be introduced in an excess amount, whereby $^{54}Mn$ ions formed by the reaction of $^{54}Fe(n, p)$ often causes the surface dosage in the primary system to increase.

When the Fe/Ni molar concentration ratio on the fuel cladding surface increases, the activity of $^{54}Mn$ crud or $^{60}Co$ crud increases qualitatively and, however, $^{60}Co$ ion or $^{58}Co$ ion decreases qualitatively.

An object of the present invention is to provide a method of inhibiting radioactive substances from eluting into the cooling water in a nuclear plant, wherein the iron concentration in the cooling water can be suppressed, and the amount of sedimenting crud-like (insoluble) radioactive substances is as small as possible.

Another object of the present invention is to provide a method of inhibiting radioactive substances from eluting into the cooling water in a nuclear plant, wherein the iron concentration in the cooling water can be controlled to decrease the $^{58}Co$ ion and $^{60}Co$ ion concentrations in the cooling water.

A further object of the present invention is to provide a method of inhibiting radioactive substances from eluting into the cooling water in a nuclear plant, wherein the surface dosage in the primary system can be decreased at the time of regular checking contributing to decreasing the surface dosage in the primary system to which a worker may be exposed. In the present invention, the "crud" is defined as a particle substance which does not pass through the myriapore filter having 0.45 $\mu$m pore. The "ion" is defined as a substance which passes through the myriapor filter having 0.45 $\mu$m pore.

The above-mentioned objects are achieved by a method of inhibiting radioactive substances from eluting into the cooling water in a nuclear plant in which after a new fuel cladding, which is an unused one and is loaded into the nuclear reactor for the first time and further does not have material substance adhering on the fuel cladding surface, is loaded into the nuclear reactor. With nuclear heating, an iron ion source is injected into the cooling water in order to form an iron oxide layer on the fuel cladding surface; and after the iron oxide layer is formed on the fuel cladding surface at a covering ratio of 100%, an injecting amount of the iron ion source is lowered so that an Fe/Ni molar concentration ratio in the cooling water is set in a range of from about 2 to 10.

The iron ion or the iron crud is injected during the pre-operation to form the iron oxide layer on the fuel cladding surface at the covering ratio 100%. The iron concentration in the cooling water is controlled by controlling a flow rate of the cooling water through a condensed water by-pass line. The iron concentration in the cooling water is controlled by controlling an iron electrolyzing current.

Monitoring the amounts of iron, nickel and cobalt in the cooling water of the boiling water reactor makes it possible to learn the amounts of corrosion products such as iron crud, nickel ion and cobalt ion that are brought into the nuclear reactor within a period of time in which measurement is taken, and serves as an input that is necessary for calculating the amount of material substance adhered on the fuel cladding surface.

Further, estimating the amount of material substances adhered on the fuel cladding surface by calculation, and controlling the amount thereof, are effective for efficiently reacting the iron crud that builds up on the fuel cladding surface with nickel and cobalt, for reducing the $^{58}Co$ ion and $^{60}Co$ ion concentrations in the cooling water, and for inhibiting the amount of undesired radioactive crud such as $^{54}Mn$ from increasing. The amount of the iron crud adhered on the fuel cladding surface can be decreased by controlling the ion concentration of the iron crud in the cooling water.

In accordance with the present invention, in an apparatus for inhibiting radioactive substances from eluting into the cooling water in a nuclear plant, the nuclear plant includes a nuclear reactor, a steam turbine, a condenser, a condensed water purifying unit, a feed water heater, a recirculation system, a means for measuring iron concentration in the cooling water on a downstream side of the feed water heater, a means for measuring nickel concentration in the cooling water on the downstream side of the feed water heater, a means for injecting iron into the cooling water on the downstream side of the condensed water purifying unit, and a control unit for controlling the iron concentration injecting means so as to adjust an amount of iron injected based upon a signal sent from the iron concentration measuring means and the nickel concentration measuring means and for representing an amount of the iron concentration.

A means for controlling the iron concentration in the cooling water is provided in the nuclear plant; the iron concentration controlling means comprise a means for evaluating a total amount of iron concentration adhered on the fuel cladding surface based upon the iron concentration in the cooling water, a means for controlling the amount of iron injected into the cooling water based upon the total amount of the iron concentration on the fuel cladding surface, and a means for supplying iron that is to be injected through the iron concentration injecting amount controlling means.

According to the present invention, $^{58}$Co ion and $^{60}$Co ion concentrations in the cooling water can be decreased without much increasing the concentration of precipitating radioactive crud such as $^{60}$CoFe$_2$O$_4$, $^{58}$CoFe$_2$O$_4$ or $^{54}$MnFe$_2$O$_4$, and the surface dosage in the primary system can be decreased at the time of regular checking contributing to decreasing the surface dosage in the primary system to which a worker may be exposed.

DESCRIPTION OF THE EMBODIMENTS

Figure 1:
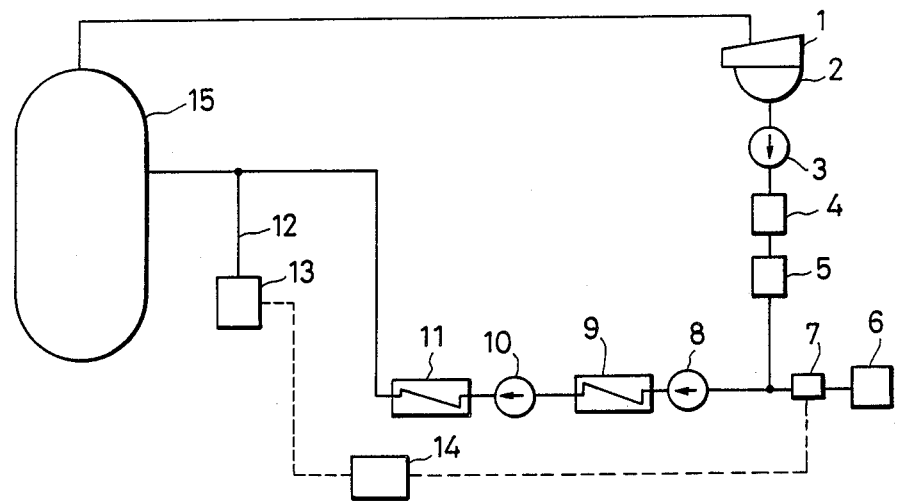
FIG. 1 is a diagram showing a feed water system in a boiling water reactor according to one embodiment of the present invention.

Embodiment 1:

One embodiment of the present invention will now be described in conjunction with FIG. 1 which illustrates a feed water system of a boiling-water reactor. The steam generated from a steam turbine 1 is led into a condenser 2. The condensed water from the condenser 2 contains corrosion products in large amounts.

However, most of the corrosion products such as iron, cobalt and nickel is removed as the condensed water that is pumped by a pump 3 passes through a condensed water pre-filter 4 and a condensed water desalting unit 5. The purified water passes through a water supply pump 8, a low-pressure feed water heater 9, a booster pump 10, a high-pressure feed water heater 11, and is guided to a pressurized vessel 15 of the nuclear reactor.

The corrosion products brought into the pressurized vessel 15 of the reactor consist of those that were not removed by the condensed water desalting unit 5 and nickel etc. that is generated chiefly by the corrosion of the high-pressure feed water heater 11. The amount brought in can be detected by measuring the sampling water using a concentration measuring device 13 for measuring an iron concentration, a nickel concentration, and an cobalt concentration; the sampling water is obtained through a sampling line 12.

According to one embodiment of the present invention, after the new fuel rod is loaded into the nuclear reactor, pre-operation in the boiling water reactor is carried out. With the nuclear heating the iron ion source such as an iron crud or an iron ion is injected into the cooling water in order to form the iron oxide layer on the fuel cladding surface.

According to one embodiment of the present invention, the measured concentration value is guided to a controller 14 to estimate the amount of adhesion of the substance such as the iron crud on the fuel cladding surface, and a valve 7 is so adjusted that the iron is injected from an iron injecting device 6 into the cooling water at an optimum iron concentration.

Figure 2:
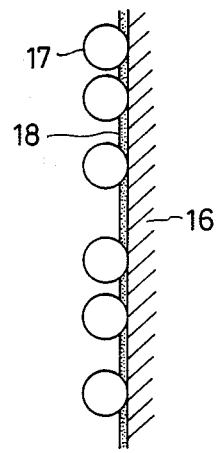
FIG. 2 is a diagram which schematically illustrates the fuel cladding surface on an enlarged scale.

The reasons for estimating and controlling the amount of material substance adhering on the fuel cladding surface will be described in conjunction with FIG. 2, which schematically illustrates a fuel cladding surface 16 on an enlarged scale and which represents the case where the iron is adhered in small amount on the fuel cladding surface 16. The iron adheres on the fuel cladding surface 16 mostly in the form of iron crud particles 17.

If the fuel cladding surface 16 is not sufficiently covered with the iron crud particles 17, a layer 18 of NiO or CoO is formed on the fuel cladding surface 16. The layer 18 of NiO or CoO serves as a main factor that raises the $^{58}$Co ion and $^{60}$Co ion concentrations in the cooling water.

Therefore, the fuel cladding tube or the fuel rod that is covered with the iron crud particles 17 with a covering ratio 100% is effective in inhibiting the formation of the NiO layer 18 or CoO layer 18. When the iron crud particles 17 adhere on the fuel cladding surface 16 in an excess amount, on the other hand, the iron crud concentration in the cooling water rises when the iron crud particles 17 are peeled off easily.

The iron crud particles 17 then serve as carriers, and the precipitating radioactive crud such as $^{60}$CoFe$_2$O$_4$, $^{58}$CoFe$_2$O$_4$ or $^{54}$MnFe$_2$O$_4$ results in an increase in the surface dosage in the primary system of pedestal under the pressurized vessel 15 of the nuclear reactor.

Therefore, the amount of the iron crud particles 17 adhered on the fuel cladding surface 16 should desirably be as small as possible, but be sufficient for covering the surface of the fuel cladding tube or the fuel rod and be also sufficient to react with nickel or cobalt to form NiFe$_2$O$_4$ or CoFe$_2$O$_4$.

The amount of the iron adhered on the fuel cladding surface 16 can be controlled by controlling the amount of the iron brought in by the feed water, i.e., by controlling the iron concentration in the cooling water. The control method will now be explained in conjunction with FIG. 3 which is a flow chart for controlling the iron concentration in the feed water.

Concentrations of iron, nickel and cobalt in the cooling water are denoted by CFe, CNi and CCo, measuring interval is denoted by t, flow rate of the cooling water is denoted by F, and the amounts of iron, nickel and cobalt which adhere onto the fuel cladding surface are denoted by MFe, MNi and MCo.

Then, the amounts MFe', MNi' and MCo' of iron, nickel and cobalt which newly adhere onto the fuel cladding surface can be estimated as follows:

$$MFe' = MFe + aCFeFt - \zeta cMFet$$

$$MNi' = MNi + bCNiFt - \zeta iMFet$$

$$MCo' = MCo + cCNiFt - \zeta iMCot$$

where a, b and c are correction coefficients for estimating the amount that newly adhere to the fuel cladding surface from the concentration of the feed water, and where a has a value of from 0.7 to 1.0, and b and c have values of from 0.6 to 1.2 that vary depending upon the constituted materials of the nuclear plant. Further, symbols $\zeta c$ and $\zeta i$ correspond to rate coefficients that decrease due to peeling off or elution of the crud or the ion from the fuel cladding surface.

A setpoint value d of the amount of iron adhered onto the fuel cladding surface is found from the following equation $$d = 1 \times 10^{-4} e \times S \times 5.2 \times \frac{111.6}{159.6} = 3.6 \times 10^{-4} \times e \times S$$

where the iron crud layer has a thickness e of from 0.2 to 1.0 μm, so that the fuel cladding surface is sufficiently covered with iron, the total outer surface area of the fuel cladding tube is denoted by S and the hematite (Fe$_2$O$_3$) has a density of 5.2 g/cm$^3$.

Here, if the total outer surface area of the fuel cladding tube S=7×10$^7$ cm and the thickness of the iron crud layer e=1.0 μm, then the amount of the iron adhered onto the fuel cladding surface setpoint value d becomes about 25 Kg. When the iron concentration amount MFe does not reach the setpoint value d of the amount of the iron adhered onto the fuel cladding surface that is determined as described above, the iron concentration in the cooling water is adjusted to be from about 0.3 to 1 ppb so that the iron concentration amount MFe exceeds the setpoint value d as quickly as possible.

Here, however, if the iron concentration in the cooling water is so increased as to exceed 1 ppb, the iron crud may undesirably build up on portions other than the fuel cladding tube. When a relationship MFe>d satisfied, a relationship MFe>2(MNi+MCo) will be maintained by controlling the iron concentration in the cooling water, so that the iron will not be brought into the nuclear reactor in an excess amount.

The iron concentration in the cooling water can be measured by a method according to which the cooling water is permitted to pass through a myriapore filter. The nickel and cobalt concentrations in the cooling water can be measured by a method according to ion exchange resin that is now widely used to trap and condense them followed by analysis by the atomic absorption method, or can be measured by a method which uses a conductivity measuring instrument in an on-line manner. When measured batchwise, the results of measurement must be input to the controller 14 in an off-line manner.

Figure 4:
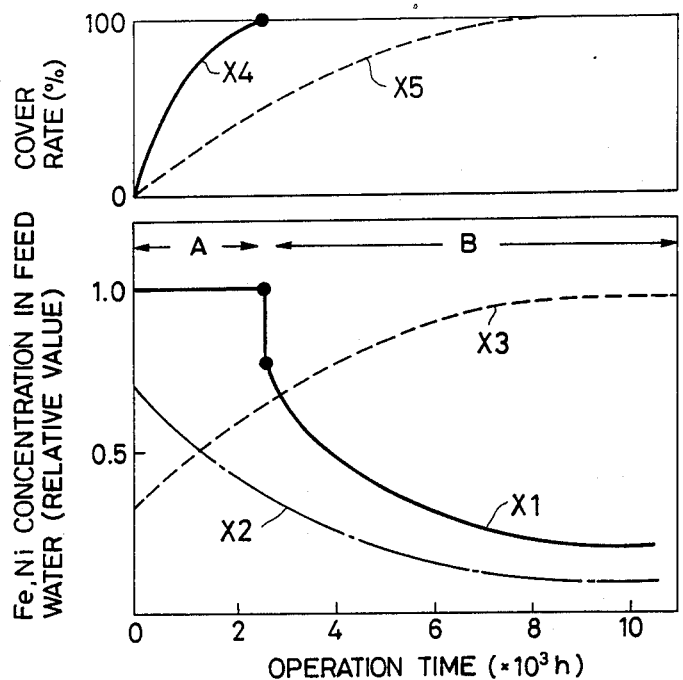
FIG. 4 is a diagram which illustrates a pattern for controlling the iron concentration of the cooling water according to the present invention in comparison with that of the conventional method.

FIG. 4 shows the change of iron concentration X1 in the cooling water with the passage of time when the present invention is adapted in comparison with when a conventional method X3, X5 is employed.

According to the conventional method, the iron concentration in the cooling water is gradually increased with the radioactive cobalt ($^{58}$Co) ion concentration in the cooling water as an index, the nickel ions being brought into the nuclear reactor from the feed water system become the radioactive radioactive cobalt ($^{58}$Co) ions.

According to one embodiment of the present invention, on the other hand, the index consists of an amount of iron adhered onto the fuel cladding surface that is calculated from the iron concentration of the cooling water and the operation time.

In FIG. 4, furthermore, a covering ratio (%) X4 found from the amount (W) of the iron adhered on the fuel cladding surface and a setpoint amount (W$_0$) of the iron adhered on the fuel cladding surface in accordance with the following equation, is indicated as an index, i.e., $$\text{covering ratio (\%)} = \frac{\text{Amount of iron adhered onto the fuel cladding surface}}{\text{Setpoint amount of iron adhered onto the fuel cladding surface}} \times 100$$

That is, according to one embodiment of the present invention, concentration (C) of iron ion or iron crud in the cooling water is measured, a covering ratio (%) of an iron oxide film or an iron oxide layer on the fuel cladding surface is found based upon the heat flux (Q) of the fuel rod or the fuel cladding tube, latent heat (L) of vaporization, the operation time (t), and a deposition rate coefficient (K) in accordance with the following equation (i) and (ii):

$$W = K \cdot Q \cdot C \cdot t / L \quad (i)$$

$$\text{covering ratio (\%)} = (W/W_0) \times 100 \quad (ii)$$

The formation of the layer of the iron oxide on the fuel cladding surface is confirmed based upon the covering ratio of 100%, and the oxidation processing is finished.

When the covering ratio is smaller than 100% in the present invention, the iron concentration in the cooling water is controlled to remain constant, which is maximum concentration permitted under the operation condition of the nuclear plant (corresponds to a period A in FIG. 4).

Desirably, the Fe/Ni molar concentration ratio of the cooling water is controlled to become about 2 that is necessary for forming NiFe$_2$O$_4$ at a moment when the covering ratio has reached 100%.

Figure 5:
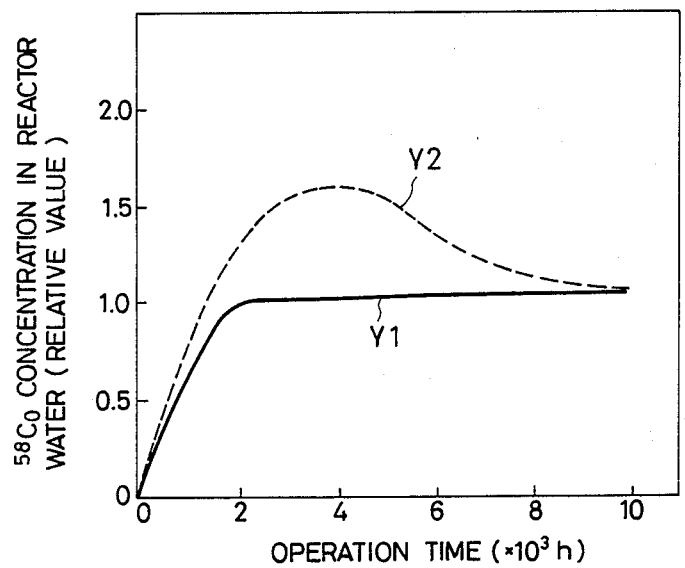
FIG. 5 is a diagram which quantitatively illustrates the effects according to one embodiment of the present invention.

FIG. 5 is a diagram in which the change of $^{58}$Co ion concentration in the cooling water with the passage of time is analytically found at the time when the iron concentration of the cooling water is controlled according to two kinds of patterns shown in FIG. 4.

According to the conventional method Y2, as will be obvious from FIG. 5, the overshoot phenomenon develops in the $^{58}$Co ion concentration. According to embodiment Y1 of the present invention, on the other hand, the overshoot phenomenon developing in the $^{58}$Co ion concentration is prevented from taking place. Consequently, therefore, the radioactive substances build up in least amounts on the inner surfaces of conduits about the reactor core.

According to one embodiment of the present invention, the Fe/Ni molar concentration ratio in the cooling water is adjusted to be set from about 2 to 10 after the layer of iron oxide has been formed under the operation condition of the nuclear plant (corresponds to a period B in FIG. 4). This is because when the Fe/Ni molar concentration ratio is greater than 2, the nickel ions and cobalt ions adhered on the fuel cladding surface can exist in the form of a compound oxide at a rate of 1 to 2 with respect to the iron, i.e., can exist in the form of $NiFe_2O_4$ and $CoFe_2O_4$.

When the Fe/Ni molar concentration ratio is smaller than 2, however, the nickel ions and cobalt ions are present in an excess amount with respect to the iron, whereby the nickel ions and cobalt ions tend to exist as sole oxides, i.e., as NiO or CoO.

When the Fe/Ni molar concentration ratio is zero, the nickel ions and cobalt ions all adhere in the form of NiO and CoO on the fuel cladding surface. When the Fe/Ni molar concentration ratio is excessively high, on the other hand, the iron crud adheres in large amount on the fuel cladding surface after the nuclear reactor is operated for extended periods of time, and the peeling of the radioactive crud ($^{60}CoFe_2O_4$, $^{58}CoFe_2O_4$) formed on the fuel cladding surface can no more be neglected.

The same effects are obtained even when the Fe/Ni molar concentration ratio is controlled to become greater than 2. In this case, however, the iron is adhered on the fuel cladding surface in an excess amount, whereby crud-like (insoluble) radioactive cobalt is formed at a increased rate.

According to one embodiment of the present invention, when the iron oxide layer is formed on the fuel cladding surface at the covering ratio of 100%, the Fe/Ni molar concentration ratio should particularly preferably be to be set from about 4 to 6.

Figure 6:
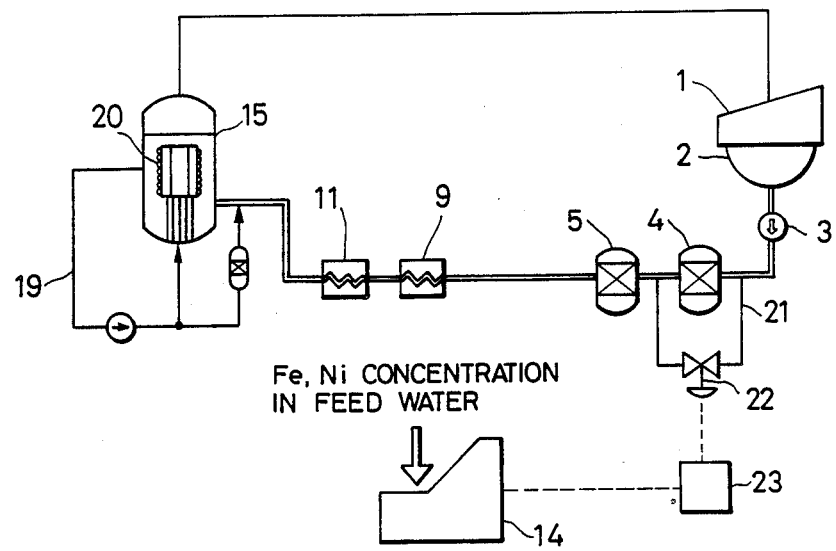
FIG. 6 is a diagram illustrating one structure of the nuclear plant when the present invention is adapted to a practical nuclear plant system.

Embodiment 2:

FIG. 6 concretely illustrates a control system of when the present invention is adapted to a practical nuclear plant. In FIG. 6, reference numeral 21 denotes a condensed water by-pass line, 22 denotes a by-pass flow rate control valve, and 23 denotes a valve open/close controller. The condensed water by-pass line 21 is formed between the pump 3 and the condensed water desalting unit 5 bypassing the condensed water pre-filter 4. The by-pass flow rate control valve 22 is provided on the condensed water by-pass line 21, and the valve open/close controller 23 is connected to the by-pass flow rate valve 22.

In response to a control signal from a device 14 which evaluates the amount of the iron adhered on the fuel cladding surface, the valve open/close controller 23 operates to change the opening degree of the by-pass flow rate control valve 22, so that the flow rate of the cooling water through the by-pass changes.

As the flow rate of the cooling water through the condensed water by-pass line 21 increases, the efficiency for removing the iron crud decreases through the condensed water pre-filter 4 and the iron concentration in the cooling water increases.

As the flow rate of the cooling water through the condensed water by-pass line 21 decreases, on the other hand, the iron concentration of the cooling water decreases. By controlling the flow rate of the cooling water through the condensed water by-pass line 21, therefore, the iron concentration in the cooling water can be controlled according to an optimum pattern that is shown in FIG. 4.

Figure 7:
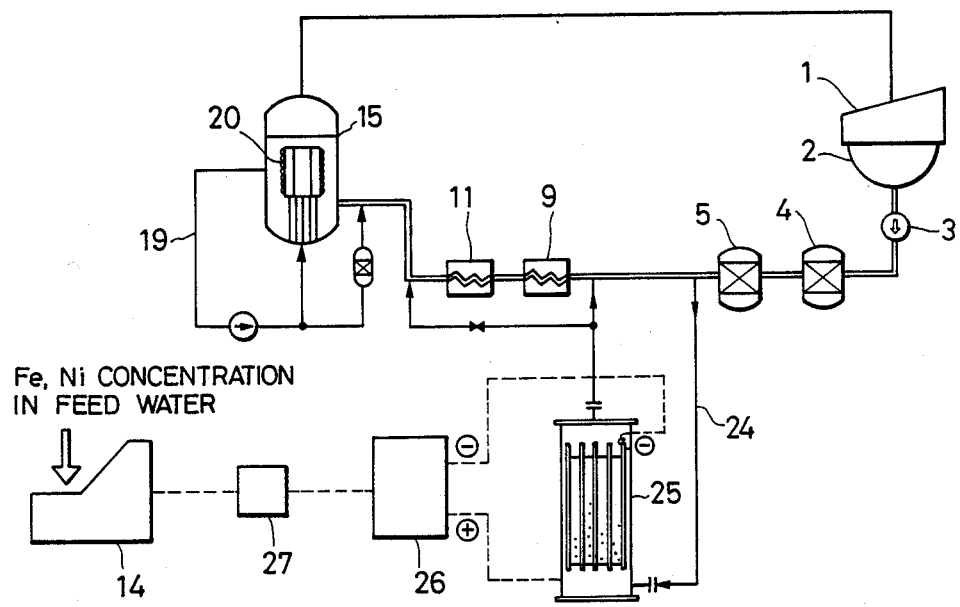
FIG. 7 is a diagram illustrating another structure of the nuclear plant when the present invention is adapted to a practical nuclear plant system.

Embodiment 3:

FIG. 7 concretely illustrates another control system where the present invention is adapted to a practical nuclear plant. In FIG. 7, reference numeral 24 denotes a feed water by-pass line, 25 denotes an iron electrolyzing device, 26 denotes a DC power source for electrolysis, and 27 denotes an electrolyzing current controller.

The feed water by-pass line 24 is formed between the condensed water desalting unit 5 and the low-pressure feed water heater 9. The iron electrolyzing device 25 is provided at the downstream of the feed water by-pass line 24. The DC power source 26 for electrolysis is connected to the iron electrolyzing device 25. The electrolyzing current controller 27 is connected to the DC power source 26. In response to a control signal from the device 14 which evaluates the amount of the iron concentration adhered on the fuel cladding surface, the electrolyzing current controller 27 operates to change the electrolyzing current of the iron electrolyzing device 25. The amount of the iron ions generated in the iron electrolyzing device 25 increases with the increase in the electrolyzing current, whereby the iron concentration of the cooling water increases.

On the contrary, the amount of the iron ions decreases with the decrease in the electrolyzing current, whereby the iron concentration in the cooling water decreases. By controlling the iron electrolyzing current, therefore, the iron concentration in the cooling water can be controlled in accordance with an optimum pattern that is shown in FIG. 4.

Modified Embodiments:

In the aforementioned embodiments of the present invention, the total amount of iron that is necessary to completely cover the whole fuel cladding surface with the iron crud was used as an index for controlling the iron concentration in the cooling water. It is, however, allowable to use another index which represents the adhesion of the iron crud formed on the fuel cladding surface. For example, it is allowable to use the total amount of the iron crud adhered on the fuel cladding surface that is obtained from the experience in operating the nuclear plant.

Figure 3:
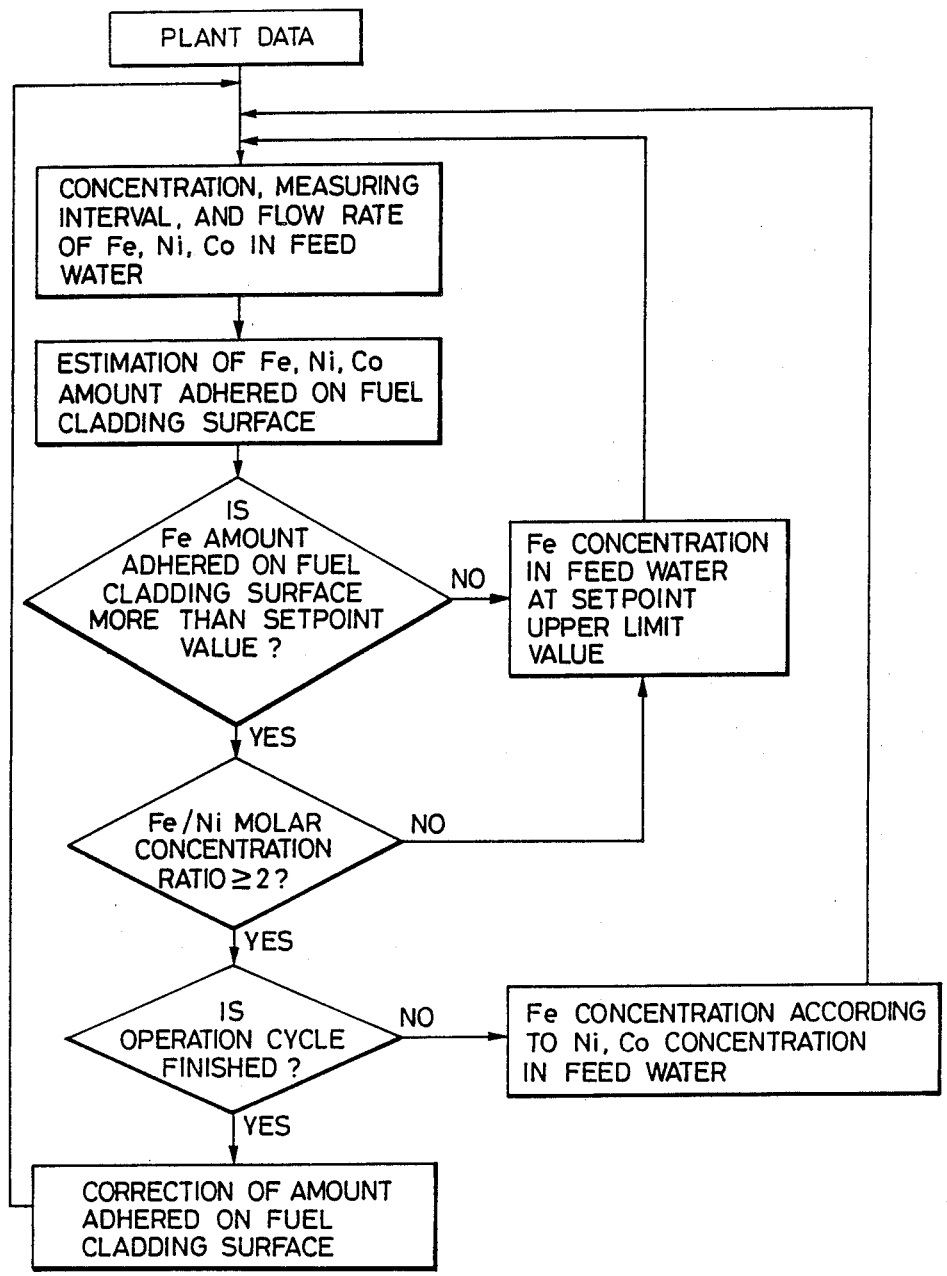
FIG. 3 is a flow chart which illustrates a method of controlling the iron concentration of the cooling water according to the present invention.

The same effects can also be obtained even when the adhesion of the iron crud as visually observed through a periscope, or signals from a sensor that measures the physical quantities reflecting the adhering amount of the iron crud on the fuel cladding surface, are used for determining whether the amount of the iron crud adhered on the fuel cladding surface has reached a predetermined or preset value or not on the flow chart of FIG. 3. In general, however, it is difficult and lacks practicality to bring into the nuclear reactor the devices for carrying out the observation and the measurement.

What is claimed is:

1. A method of inhibiting radioactive substances from eluting into the cooling water in a nuclear plant, wherein, after a new fuel cladding is loaded into a nuclear reactor, a source of iron ions is injected into the cooling water, during nuclear heating, in order to form an iron oxide layer on a surface of the new fuel cladding with a covering ratio of 100%; and, after said iron oxide layer has been formed on said surface of the new fuel cladding, an amount of said source of iron ions injected into the cooling water is decreased so that a Fe/Ni molar concentration ratio in the cooling water is set in a range of from about 2 to 10.

2. A method of inhibiting radioactive substances from eluting into the cooling water in a nuclear plant according to claim 1, wherein a source of iron ions is injected during a pre-operation of the nuclear plant to form said iron oxide layer on said surface of the new fuel cladding.

3. A method of inhibiting radioactive substances from eluting into the cooling water in a nuclear plant according to claim 1, wherein said Fe/Ni molar concentration ratio is controlled to be about 2 when said iron oxide layer covers said surface of the new fuel cladding at the covering ratio of 100%.

4. A method of inhibiting radioactive substances from eluting into the cooling water in a nuclear plant according to claim 1, wherein the iron oxide layer formed on the surface of the new fuel cladding is the minimum necessary to provide the covering ratio of 100% and to react with nickel or cobalt to form $NiFe_2O_4$ or $CoFe_2O_4$.

5. A method of inhibiting radioactive substances from eluting into the cooling water in a nuclear plant according to claim 1, wherein the iron oxide layer has a thickness of 0.2 to 1.0 $\mu$m.

6. A method of inhibiting radioactive substances from eluting into the cooling water in a nuclear plant according to claim 1, wherein an iron concentration in the cooling water is controlled by controlling a flow rate of the cooling water through a condensed water by-pass line.

7. A method of inhibiting radioactive substances from eluting into the cooling water in a nuclear plant according to claim 1, wherein an iron concentration in the cooling water is controlled by controlling an iron electrolyzing current.

8. A method of inhibiting radioactive substances from eluting into the cooling water in a nuclear plant according to claim 1, wherein said source of iron ions is an iron crud, said iron crud being injected during a pre-operation of the nuclear plant to form said iron oxide layer on said surface of the new fuel cladding.

9. A method of inhibiting radioactive substances from eluting into the cooling water in a nuclear plant according to claim 8, wherein the adhesion of iron crud as visually observed is used for determining whether an amount of said iron crud adhered on said fuel cladding surface has reached a preset value or not.

10. A method of inhibiting radioactive substances from eluting into the cooling water in a nuclear plant according to claim 1, wherein a concentration of said source of iron ions in the cooling water is measured; a covering ratio (%) of said iron oxide layer on said surface of the new fuel claddings is found from the following equations (i) and (ii), where K is a deposition rate coefficient, Q is heat flux of the new a fuel cladding, C is concentration of source of iron ions, t is an operation time, L is a latent heat of vaporization, W is an amount of iron adhered on said surface of the new fuel cladding, and $W_O$ is a setpoint amount of iron adhered on said surface of the new fuel cladding, $$W = K\,Q\,C\,t/L \qquad (i)$$

$$\text{covering ratio (\%)} = (W/W_0) \times 100; \qquad (ii)$$

formation of said iron oxide layer on said surface of the new fuel cladding is confirmed based upon the covering ratio; and an oxidation processing to form on the surface of the new fuel cladding the iron oxide layer is finished when the covering ratio of said iron oxide layer reaches 100%.

11. A method of inhibiting radioactive substances from eluting into the cooling water in a nuclear plant according to claim 10, wherein said Fe/Ni molar concentration ratio is controlled to be about 2 when said iron oxide layer is covered on said surface of the new fuel cladding at the covering ratio of 100%.

12. A method of inhibiting radioactive substances from eluting into the cooling water in a nuclear plant according to claim 10, wherein, after said iron oxide layer has been formed at the covering ratio of 100%, said Fe/Ni molar concentration ratio in the cooling water is adjusted to a value of from about 2 to 10.

13. A method of inhibiting radioactive substances from eluting into the cooling water in a nuclear plant according to claim 12, wherein said Fe/Ni molar concentration ratio is adjusted to a value of from about 4 to 6.

* * * * *